United States Patent [19]
Allred
[11] Patent Number: 4,607,466
[45] Date of Patent: Aug. 26, 1986

[54] METHOD AND APPARATUS FOR CONTROLLING REVERBERATION OF SOUND IN ENCLOSED ENVIRONMENTS

[76] Inventor: John C. Allred, 798 47th St., Los Alamos, N. Mex. 87544

[21] Appl. No.: 614,653
[22] Filed: May 29, 1984
[51] Int. Cl.[4] .......................... B24B 5/00; B32B 3/26; E04B 1/82
[52] U.S. Cl. ........................................ 52/144; 52/145; 52/309.8; 52/741; 181/284; 181/288; 181/289; 181/290; 181/291; 181/292; 181/293; 181/294; 181/296; 428/312.4
[58] Field of Search .............. 52/145, 144, 741, 309.8; 181/284, 288, 289, 290, 291, 292, 293, 294, 296; 428/312.4

[56] References Cited

U.S. PATENT DOCUMENTS 3,021,915 2/1962 Kemp ................................ 52/145 X
3,022,607 2/1962 Toulmin, Jr. ......................... 52/145
4,084,367 4/1978 Saylor et al. ..................... 52/145 X

*Primary Examiner*—Thurman K. Page
*Attorney, Agent, or Firm*—Dula, Shields & Egbert

[57] ABSTRACT

The present invention is an acoustic panel having a porous layer and a generally rigid layer affixed to each other. The generally rigid layer includes at least one passageway opening on one side of the rigid layer and extending through the rigid layer to the porous layer. The porous layer is a fibrous material. The rigid layer is a concrete-type material, such as vermiculite-cement plaster. This acoustic panel further comprises a generally rigid planar surface positioned adjacent to the porous layer. This generally rigid planar surface can comprise an insulating layer affixed to the other side of the porous layer and a structural layer fastened to the insulating layer. The insulating layer is a polyurethane foam board. The structural layer is a particle board.

21 Claims, 4 Drawing Figures

METHOD AND APPARATUS FOR CONTROLLING REVERBERATION OF SOUND IN ENCLOSED ENVIRONMENTS

TECHNICAL FIELD

The present invention generally relates to the field of acoustics. More particularly, the present invention relates to methods and apparatus used to control and acoustically design enclosed environments.

BACKGROUND ART

Acoustics often has been regarded as a science dealing only with hearing conditions in auditoriums, but there are other aspects of the environment in which it plays an important role. Every office building, airport terminal, hospital, and even the private house has sound and noise-control problems. If these problems are not recognized and dealt with during the design of the structure, they must be corrected later.

A sound source produces pressure variations in the air, compressions and rarefactions moving outward from the source in a progressive wave at a speed of about 1100 feet per second. In free space, the energy intensity in the wave decreases as the distance from the source increases. Sound waves indoors are reflected many times by the enclosing surfaces, the intensity remaining more or less uniform throughout a room. The sound wave carries energy from the source to the ear or other receiver.

The amount of sound energy that reaches the listener depends on the paths by which the sound has traveled, on the distance from the source, the power of the source, and the nature of such intervening barriers as walls, doors, windows, and sound-absorbing ducts. Qualities that characterize a desirable acoustic environment vary widely, depending on how the space is to be used, how particular the users are, and how the specific space involved relates to other parts of the building. The acoustic character of a space is as important as the amount of sound generated in it or transmitted into it. If a room is finished in hard, sound-reflecting materials, sounds in the room not only persist but seem to come from all directions. There are optimum ranges for the reverberant character of occupied spaces.

When a sound wave strikes a sizable surface, such as a wall or ceiling, part of it is reflected, part of it is absorbed, and part of it may be transmitted to some adjoining space. The relative magnitudes of the three parts of the original sound are determined by the physical properties of the surface. A hard-surfaced, dense plaster reflects most of the sound that strikes it, while a soft surface such as a heavy carpet reflects little sound. Absorption and reflection are important only in connection with the space in which the sound originates. Useful sound absorption is provided by porous material such as carpets, draperies, glass-fiber blankets, clothing, and specially-made sound-absorbing materials. An essential property of a sound-absorbing material is that it have a porous structure into which the molecules in the air carrying sound energy can dissipate that energy in the form of heat. Sound energy so dissipated is never recovered as sound. When sound-absorbing materials are placed within a room, the reflection of energy is greatly reduced and the sound dies away rapidly.

Good hearing conditions for an audience listening to speech or music, whether in an auditorium, courtroom, church, theater, or living room, depend on four basic conditions. The space must be quiet, the sounds to be heard must have adequate loudness, there must be a good dispersion of sound, and the sounds must be properly blended, with adequate separation for good articulation of music or speech. This latter quality is particularly important with regard to the present invention.

The blending of sounds is produced by a process that is called reverberation. The reverberation time in a room is arbitrarily defined as the time required for the sound to decrease to one-millionth of its original intensity after the source is cut off. Reverberation time is determined by the volume of the room and by the sound-absorbing properties of the finishes, furnishings, and people in the room. The greater the volume, the greater the reverberation time. The greater the area of sound-absorbing finishes, however, the less the reverberation time. In many theaters and auditoriums the audience is a principal absorber of sound. For this reason fabric-upholstered seats that absorb sound in the same way as the audience does are employed to minimize the variation in the reverberation time with varying audience size.

In general, a relatively long reverberation time is needed for a sufficient blending of musical sounds but a shorter one is needed for the proper understanding of speech. A matter not well understood until recently has been the importance of balancing very carefully the amount of early sound (original signal plus early reflection) with the energy that reaches the ear in the reverberant field (after many reflections about the room). If there is too much early sound, the effect is too articulate and "dry". On the other hand, if there is too much reverberant energy, the effect is fuzzy, or "wet". The optimum ratio between the early and the reverberant energy varies with the preferences of the users of the space.

Wallace Clement Sabine, in the early 20th century, appears to have been the first person to recognize that the performance of an auditorium can be quantified. Sabine defined the reverberation time of a space as the time required for the sound energy in an enclosure to decrease by a factor of one million and gave a formula for the reverberation time as:

$$T_R = \frac{0.049\ V}{\alpha\ S}$$

Where V is the volume of the space, $\alpha$ the average absorption coefficient, and S the surface area (all in English units). Sabine recognized that the optimum reverberation time for a room increases with its volume and depends upon frequency, as well as upon the kind of sound that one is trying to enhance.

During the first half of the 20th century, other investigators improved both the physical basis of architectural acoustics and the psychological basis, mostly empirical, of optimum room characteristics. Among these investigators the names of Morse, Beranek, Knudsen and Harris are some of the best known, although many other people made important contributions.

In the acoustical design of a room, it is common practice to try to achieve a desired value of reverberation time at six frequencies at octave intervals; namely, 125, 250, 500, 1,000, 2,000, and 4,000 Hertz (Hz). This frequency range covers all of the range of song and speech "fundamentals" and most of the range of orchestral instruments, though not all. There are, of course, other considerations in acoustical design, one of these being the arrangement of surfaces in order to yield desired dispersion of the sound field.

It is a fact of physics that velocity (of the transmitting medium) in a sound wave is directly proportional to frequency. It follows that any substance which absorbs sound will tend to absorb high frequencies more than low frequencies. This is found to be so by measurement. However, the principle of resonance in physics can be used to increase the velocity in a sound wave at or near a resonant frequency and thus to increase absorption at low frequencies by design of suitable resonators.

It is an object of the present invention to provide a cost-effective method and apparatus of acoustically designing an enclosed environment.

It is another object of the present invention to provide a tunable, resonant acoustic panel.

It is still another object and advantage of the present invention to provide an acoustic panel that is simple to install.

These and other objects and advantages of the present invention will become apparent from a reading of the attached specification and appended Claims.

SUMMARY OF THE INVENTION

The apparatus of the present invention is an acoustic panel comprising a porous layer and a generally rigid layer affixed to the porous layer, the two elements being placed near a rigid plane, which may be a wall. The generally rigid layer includes at least one passageway opening on one side of the rigid layer extending through the rigid layer, and opening about the other side of the rigid layer adjacent the porous layer. The porous layer comprises a fibrous material. In particular, this porous layer can be cement-bonded wood fibers. The generally rigid layer is a concrete-type of material, such as vermiculite-cement plaster. The distribution and size of the passageways that are formed in the rigid layer are placed there in accordance with the following formula:

$$F = \frac{C}{2\pi}\left(\frac{A}{lV}\right)^{\frac{1}{2}}$$

In which F is the desired resonant frequency; C is the velocity of sound; A is the area of the passageway; l is the thickness of the rigid layer; and V is the volume of air within the porous layer per each passageway. The acoustic panel of the present invention further comprises an insulating layer affixed to one side of the porous layer and a structural layer fastened to the other side of the insulating layer. The insulating layer may be polyurethane foam board and the structural layer may be particle board.

The method of the present invention controls sound reverberations in enclosed environments and comprises the steps of mounting the aforestated acoustic panels about the interior surface of an enclosed environment and drilling at least one hole into and through the rigid layer of the acoustic panel. These holes are drilled in accordance with the formula mentioned above. This method could also include the step of applying a coating to the porous layer, instead of affixing a rigid surface to it.

BEST MODE FOR CARRYING OUT THE INVENTION

Figure 1:
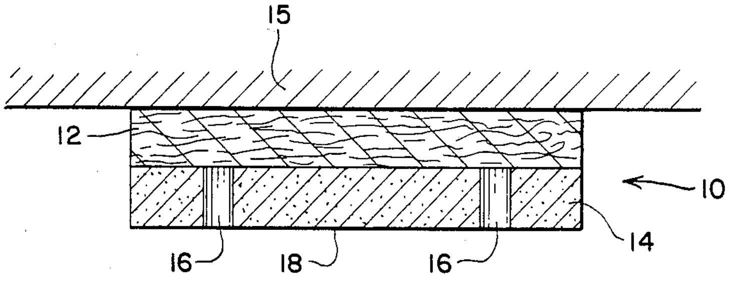
FIG. 1 is a cross-sectional view in side elevation showing the simplest embodiment of the present invention.

Referring to FIG. 1, there is shown at 10 the simplest embodiment of the acoustic panel of the present invention. Acoustic panel 10 comprises porous layer 12 and generally rigid layer 14. Layers 12 and 14 are bonded together in this layered arrangement. Layers 12 and 14 are fastened to and/or juxtaposed against a planar rigid surface 15.

Porous layer 12 is, ideally, a cement-bonded wood fiber arrangement. This cement-bonded wood fiber arrangement has a high sound-absorption coefficient at high frequencies. While cement-bonded wood fibers are a preferred material for porous layer 12 it is also possible that a variety of other materials could also be used as this porous layer. These materials could include resin-bonded wood fibers, rockwool, fiberglass, and other such fibrous sound absorbers.

Rigid layer 14 is, ideally, a layer of vermiculite-cement plaster. This plaster is a concrete-type material that covers the surface of the wood fibers in porous layer 12. The sound absorption coefficient of this hard plaster material of layer 14 is between 0.0 and 0.1. With such a low sound-absorption coefficient, this layer absorbs very little sound. While this vermiculite-cement plaster material is preferable, it is also possible that other rigid, non-sound-absorbing materials could be used. For the purposes of the present invention, materials such as plastics, cements, and other types of plasters and concrete could be used in layer 14.

Planar rigid surface 15 is located adjacent one side of porous layer 12. Rigid surface 15 may be the wall or ceiling of an enclosed environment. As explained hereinafter, planar rigid surface 15 may also be another layer integrally fastened to the porous layer 12.

The tuneability of the acoustic panel 10 of the present invention is accomplished by the forming of passageways 16 through the thickness of rigid layer 14. Passageways 16 may be either formed or drilled through rigid layer 14. These passageways open about side 18 of rigid layer 14, extend through the thickness of rigid layer 14, and open to the porous layer 12. These holes, of selected size and spacing, form resonant absorbers. The absorption qualities of acoustic panel 10 could be tuned by a selection of hole size and spacing and by varying the thickness of the rigid layer 14.

Using the Helmholtz resonator theory, a formula can be derived that shows the resonant frequency of the acoustic panel. This formula is as follows:

$$F = \frac{C}{2\pi}\left(\frac{A}{lV}\right)^{\frac{1}{2}}$$

Where C is the velocity of sound, A is the area of the passageway 16, l is the thickness of the rigid layer 16, and V is the volume of air behind rigid layer 14 in the porous, fibrous material in layer 12 that provides frictional damping of the air motion from the sound wave. A broad resonance of very high absorption results by the interaction of porous layer 12, rigid layer 14, and passageways 16.

Figure 2:
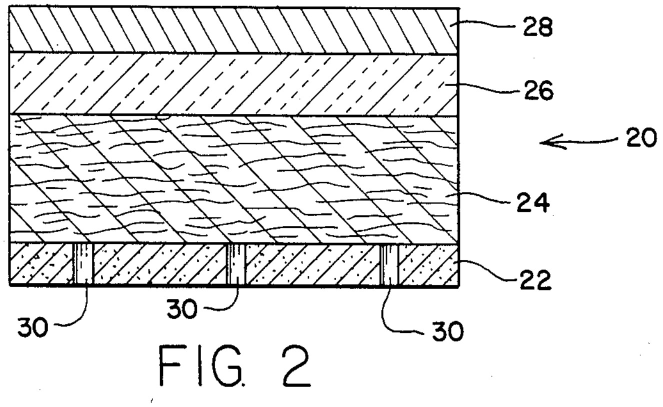
FIG. 2 is a cross-sectional view in side elevation showing the preferred embodiment of the present invention.

FIG. 2 shows at 20 the layered arrangement of the preferred embodiment of the acoustic panel of the present invention. Acoustic panel 20 comprises rigid layer 22, porous layer 24, insulating layer 26, and structural layer 28. Rigid layer 22 and porous layer 24 of acoustic panel 20 are similar to the layers described in conjunction with the simplified embodiment of FIG. 1. Insulating layer 26 is fastened to the side of porous layer 24 opposite rigid layer 22. Insulating layer 26 is thermal insulation. In particular, this insulation is polyurethane foam board. Structural layer 28 is fastened to the side of insulating layer 26 opposite porous layer 24. Structural layer 28 is particle board (or similar material) to which shingles can be nailed. This layer provides a major part of the structural strength required for roof decking. This arrangement of layers provides a unitized acoustic panel 20 that is readily available for the acoustic design of ceiling and/or roofs. In comparison to the previous embodiment, the layers 26 and 28 behave like and serve the purpose of the planar rigid surface 15. However, unlike the previous embodiment, this layered approach can also provide structural integrity to the enclosed environment being built.

This layered arrangement 20 is somewhat similar to a product currently being manufactured called "Fibroplank". This product is manufactured by Martin Fireproofing of Buffalo, N.Y. and Elberton, Ga. There are two versions of this Fibroplank that are presently being manufactured. Fibroplank I consists of layers 24, 26, and 28. Since the rigid layer is not incorporated into this design, the Fibroplank I has a high sound-absorption coefficient at high frequencies. Fibroplank II has the same structure as Fibroplank I except that there is an additional layer of vermiculite-cement concrete, like that of layer 22. Since the rigid layer is the only surface exposed to the sound, Fibroplank II has a very low sound-absorption coefficient. The present invention, on the other hand, by forming passageways 30 in layer 22, allows Fibroplank II to be tuned to desired resonances in the low-frequency range.

Figure 3:
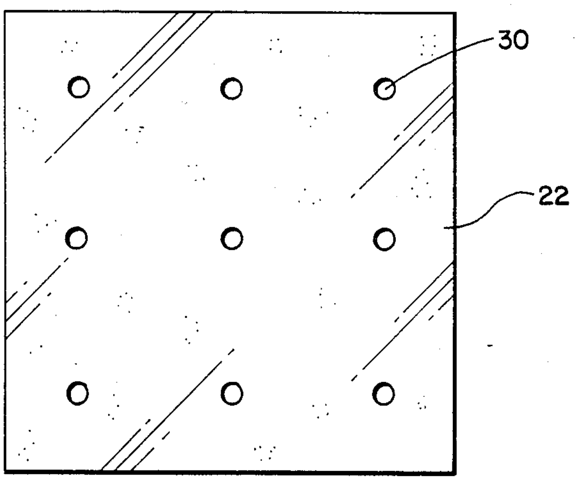
FIG. 3 is a bottom view of the acoustic panel of FIG. 2.

FIG. 3 shows a different view of the passageways 30 with respect to acoustic panel 20.

The absorption parameters obtainable through the present invention permit a new and inexpensive solution to the problem of achieving a desired reverberation characteristic, and especially of getting the necessary high absorption of sounds at low frequencies which is otherwise difficult to achieve. Spaces other than concert halls, auditoriums, and sanctuaries can benefit from the present invention. Because of the low cost of the materials used in the present invention, the acoustic tuning of spaces becomes practical and possible. In the past, acoustic tuning was only possible through the use of on-site fabrications that consisted of expensive and unsightly materials. After fabrication, further decorative treatment was required to make the surfaces aesthetically acceptable. The costs of both labor and materials often made the use of these resonant absorbers impossible. Because of the low cost of the present invention, classrooms and offices could realize improved sound control. In addition, industrial and warehouse space could benefit from the applications of the acoustic panels of the present invention.

Figure 4:
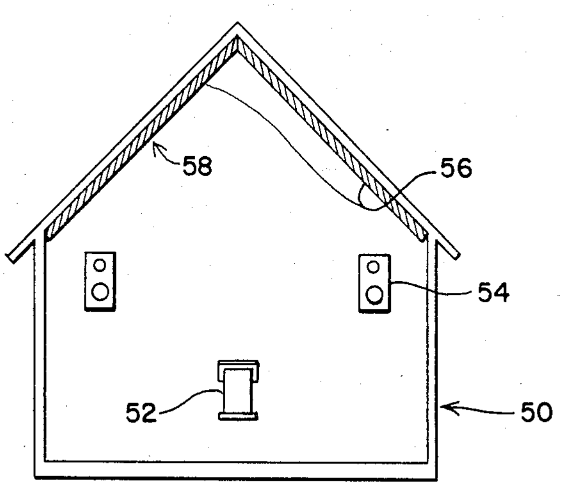
FIG. 4 is a drawing showing an application of the present invention.

The present invention also comprises a method for controlling sound reverberation in an enclosed environment. This method is somewhat illustrated in FIG. 4. FIG. 4 shows a simplified diagram of a church 50 having a podium 52, speakers 54, and acoustic panels 56. The acoustic panels 56 are mounted about the interior of church 50. Acoustic panels 56 form the ceiling 58 of the church. In addition, acoustic panels 56 also provide the structural support for the roofing of church 50. In keeping with the method of the present invention, acoustic panels 56 are mounted such that the rigid layer faces the interior of church 50. Acoustic tuning becomes possible by drilling holes (not shown) into the rigid layer of acoustic panels 56. The proper distribution(s) and size(s) of holes can be determined by applying the formula indicated on page 10. After the proper values are entered into this formula, the holes may be drilled into the rigid layer of the acoustic panel 56. After the acoustic panels 56 have been installed and the passageways drilled, the church 50 should have a suitable acoustic design.

The acoustic panels 56 may be of the embodiment of FIG. 1. In this case, the acoustic panel is attached to the existing ceiling of church 50. However, if acoustic panels 56 are of the type of FIG. 2, then they could be used to form the ceiling itself. Shingles could be nailed to the upper layer of the acoustic panel.

Previously, the acoustic design of church 50 would have meant that the higher frequencies of speech were quickly absorbed by the walls and other surroundings within the church. Since the lower frequencies would not be absorbed, but would reverberate, the speech from podium 52 would be perceived by the listener as a low rumble. Without proper acoustical design, speakers would oftentimes be difficult or impossible to understand. However, with the acoustic panels and methods of the present invention, resonance(s) can be tuned such that the lower frequencies are absorbed by acoustic panels 56. As a result, the higher frequencies of speech would be in proportion with the lower frequencies. A similar result is also accomplished when the speech from podium 52 is amplified by way of speakers 54.

An alternative method of controlling sound reverberation in an enclosed environment in accordance with the present invention comprises the steps of mounting the porous panel about the interior of the closed environment; applying a non-porous coating to the surface of the porous panel; and drilling the passageways through this coating. The porous panel, described herein, would be similar to Fibroplank I. This porous panel would have the porous layer of cement-bonded wood fibers exposed to the interior of church 50. A plaster coating could then be applied to the porous panel, after it had been mounted within the environment. After the plaster (or any other non-porous material of the types described herein) had dried, a desired number of passageways could then be drilled. The size and number of holes drilled would be in accordance with the formula shown on page 10 herein.

The foregoing disclosure and description of the invention is illustrative and explanatory thereof. Various changes in the method steps, as well as in the details of the illustrated device, may be made within the scope of the appended Claims without departing from the true spirit of the invention. For example, the required holes may be drilled before mounting of the panels is done. The invention should only be limited by the following Claims and their legal equivalents.

I claim:

1. An acoustic panel for the absorption of low frequency sounds within an enclosed environment comprising:

a porous layer of fibrous material; and a generally rigid layer of cement material affixed to said porous layer of fibrous material, said generally rigid layer including at least one passageway opening on one side of said rigid layer, said passageway extending through said rigid layer, said passageway opening about the other side of said rigid layer adjacent to said porous layer of fibrous material.

2. The acoustic panel of claim 1, said porous layer being bonded wood fibers.

3. The acoustic panel of claim 1, said porous layer and said rigid layer being positioned adjacent a generally rigid planar surface.

4. The acoustic panel of claim 1, said rigid layer being vermiculite-cement plaster.

5. The acoustic panel of claim 1, the quantity and size of said passageways occurring in accordance with the formula:

$$F = \frac{C}{2\pi}\left(\frac{A}{lV}\right)^{\frac{1}{2}}$$

in which:

F is the desired resonant frequency;

C is the velocity of sound;

A is the area of said passageway;

l is the thickness of said rigid layer; and

V is the volume of air within said porous layer per said passageway in said rigid layer.

6. The acoustic panel of claim 3, said rigid planar surface comprising:

an insulating layer affixed to the side of said porous layer opposite said rigid layer; and a structural layer fastened to the side of said insulating layer opposite said porous layer.

7. The acoustic panel of claim 6, said insulating layer being a polyurethane foam board, said structural layer being particle board.

8. A method of controlling sound reverberation in a single enclosed environment comprising the steps of:

mounting an acoustic panel about the interior of said enclosed environment, said acoustic panel comprising a porous layer and a generally rigid layer, said layers being affixed to and juxtaposed against each other, said acoustic panel being mounted such that said rigid layer faces the interior of said enclosed environment; and drilling at least one hole into and through said rigid layer of said acoustic panel.

9. The method of claim 8, said drilling being in accordance with the following formula:

$$F = \frac{C}{2\pi}\left(\frac{A}{lV}\right)^{\frac{1}{2}}$$

in which:

F is the desired resonant frequency;

C is the velocity of sound;

A is the area of said hole;

l is the thickness of said rigid layer; and

V is the volume of air within said porous layer per the number of said holes in said rigid layer.

10. The method of claim 8, said acoustic panels being mounted to a rigid surface about the interior of said enclosed environment, said porous layer being juxtaposed against said rigid planar surface.

11. The method of claim 8, said porous layer comprisisng a fibrous material, said rigid layer being a concrete-type material.

12. The method of claim 8, said acoustic panel further comprising;

an insulating layer affixed to the side of said porous layer opposite said rigid layer; and structural layer fastened to the side of said insulating layer opposite said porous layer.

13. A method of controlling sound reverberation in an enclosed environment comprising the steps of:

mounting a porous panel of generally fibrous material about the interior of said enclosed environment;

applying a coating of a cement material to the surface of said porous panel, said coating being applied to the surface of said porous panel such that said coating is disposed between the source of sound and said porous panel; and drilling at least one hole through said coating.

14. The method of claim 13, said coating of a concrete-type material being a vermiculite-cement plaster.

15. The method of claim 13, said porous panel including:

an insulating layer affixed to the side of said porous panel opposite said coating; and a structural layer fastened to the side of said insulating layer opposite said porous panel.

16. The method of claim 15, said insulating layer being a polyurethane foam board and said structural layer being a particle board.

17. The method of claim 13, said porous panel being juxtaposed against a rigid planar surface about the interior of said enclosed environment.

18. The method of claim 17, said rigid planar surface being a wall within said enclosed environment, said porous panel being affixed to said rigid planar surface.

19. The acoustic panel of claim 1, said passageway being less than two percent of the total surface area of said rigid layer.

20. The method of claim 8, the step of drilling comprising:

drilling a plurality of holes such that the total area of said holes is less than two percent of the surface area of said rigid layer.

21. The method of claim 13, the step of drilling comprising:

drilling a plurality of holes through said coating such that the total area of siad holes is less than two percent of the surface area of said coating.

* * * * *